US010415519B2

(12) United States Patent
Rikitake et al.

(10) Patent No.: US 10,415,519 B2
(45) Date of Patent: Sep. 17, 2019

(54) DUCT STRUCTURE

(71) Applicant: TOYOTA JIDOSHA KABUSHIKI KAISHA, Toyota-shi (JP)

(72) Inventors: Shunsuke Rikitake, Toyota (JP); Keisuke Kondo, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 146 days.

(21) Appl. No.: 15/647,389

(22) Filed: Jul. 12, 2017

(65) Prior Publication Data

US 2018/0023524 A1   Jan. 25, 2018

(30) Foreign Application Priority Data

Jul. 20, 2016 (JP) ................................ 2016-142125

(51) Int. Cl.
*F24H 9/12* (2006.01)
*F02M 35/10* (2006.01)

(52) U.S. Cl.
CPC ..... *F02M 35/10262* (2013.01); *F02M 35/10118* (2013.01); *Y02T 10/146* (2013.01)

(58) Field of Classification Search
CPC ............... F02M 35/10; F02M 35/16; F02M 35/10262; F02M 35/10118; F15D 1/04; B01F 2005/0621; B01F 2005/0623; B01F 2005/0625; B01F 2005/0627; B01F 15/00337
USPC .............................. 138/37, 39; 366/336, 337
See application file for complete search history.

(56) References Cited

U.S. PATENT DOCUMENTS

| 3,693,329 | A | * | 9/1972 | Willis | B01D 45/12 138/37 |
| 4,381,017 | A | * | 4/1983 | Bissinger | B64D 33/02 137/15.1 |
| 5,327,940 | A | * | 7/1994 | Presz, Jr. | F15D 1/04 138/37 |
| 6,520,738 | B2 | * | 2/2003 | Sheoran | B64D 33/02 415/205 |
| 8,449,250 | B2 | * | 5/2013 | Anschel | F02B 37/00 415/206 |
| 2013/0119703 | A1 | | 5/2013 | Fujii et al. | |

(Continued)

FOREIGN PATENT DOCUMENTS

| EP | 0 493 302 A1 | 7/1992 |
| JP | 4-277307 A | 10/1992 |
| JP | 6-221238 A | 8/1994 |

(Continued)

*Primary Examiner* — Patrick F Brinson
(74) *Attorney, Agent, or Firm* — Oblon, McClelland, Maier & Neustadt, L.L.P.

(57) ABSTRACT

A duct structure including a fin having a downstream end surface extending between an inner surface of a duct and a downstream end of a top surface of the fin in a height direction of the fin. As a result, a vortex can be intentionally generated in a downstream of the downstream end surface of the fin. Since a pressure in the vortex is lower than a pressure in a surrounding portion of the vortex, the vortex can draw a fluid flow having flowed along the top surface of the fin to the vortex and can change the flow to a flow flowing along a portion of the inner surface of the duct located downstream of the fin. As a result, a flow separation from the inner surface of the duct can be suppressed.

16 Claims, 15 Drawing Sheets

(56) References Cited

U.S. PATENT DOCUMENTS

2016/0280287 A1  9/2016 Fujii et al.

FOREIGN PATENT DOCUMENTS

| JP | 8-158963 A | 6/1996 |
| JP | 2012-246933 A | 12/2012 |
| JP | 2013-119792 A | 6/2013 |
| JP | 2013-227961 A | 11/2013 |
| JP | 2015-083459 A | 4/2015 |

* cited by examiner

DUCT STRUCTURE

TECHNICAL FIELD

The present application relates to a duct structure having a flow control fin.

BACKGROUND

At an inlet of a duct and a curved portion of the duct, a flow is disturbed and a flow separation from an inner surface of the duct is likely to occur.

In order to suppress occurrence of a flow separation from an inner surface of the duct, as illustrated in FIG. 20, Patent Document 1 discloses a structure where a flow control plate 3 formed in a form of a lattice is provided at a portion of a duct 2 close to an inlet 2a. The flow control plate 3 is provided so as to extend over an entire cross-section of the inlet 2a of the duct in a width direction and a height direction of the duct.

However, there are the following problems with the structure disclosed in Patent Document 1 above:

Since the flow control plate 3 is provided so as to extend over the entire cross section of the inlet 2a of the duct, a pressure drop caused by the flow control plate 3 is considerably large. Therefore, the structure disclosed in Patent Document 1 is required to be improved such that not only suppression of a flow separation is maintained but also a pressure drop is decreased.

RELATED ART DOCUMENT

Patent Document

Patent Document 1: JP2012-246933

BRIEF SUMMARY

An object of the application is to provide a duct structure which can achieve both suppressing a flow separation and decreasing a pressure drop.

Means for Solving the Problems

The above object may be achieved by any one of the following duct structures defined in the below first and second embodiments (hereinafter, Embodiments 1 and 2).

Technical Advantages

According to the duct structure according to an aspect of the disclosure, since the fin includes the downstream end surface having the form obtained when cutting off a downstream end portion of the fin, a vortex can be intentionally generated in the downstream of the downstream end surface of the fin. Since a pressure in the vortex is lower than a pressure in a surrounding portion of the vortex, the vortex can draw a fluid portion having flowed along a top surface of the fin and then flowing downstream of the downstream end surface of the fin to the vortex thereby causing the fluid portion to flow along a portion of the inner surface of the duct located downstream of the downstream end surface of the fin. As a result, a flow separation from the inner surface of the duct at the downstream of the fin can be suppressed. Further, since the fin is required only to rise from the inner surface of the duct and to end in the fluid passage in a height direction of the fin, the fin is not required to extend over an entire cross-section of the duct. As a result, a pressure drop caused at the fin is small and can be more decreased than a pressure drop caused at the conventional control plate.

According to the duct structure according to an aspect of the disclosure, since the space having the cross-sectional area larger than the cross-sectional area of the inlet is provided upstream of the inlet so that a fluid is caused to flow from the space to the fluid passage through the inlet, a flow of the fluid is considerably disturbed at the inlet, and a flow separation from the inner surface of the duct close to the inlet is likely to occur.

However, since the fin includes the first fin provided inside the duct and close to the inlet, a flow separation from the inner surface of the duct in a downstream of the first fin can be positively suppressed. As a result, the flow separation from the inner surface of the duct close to the inlet is more suppressed than in a case where the first fin is not provided.

According to the duct structure according to an aspect of the disclosure, since the first fin is located at the curved portion or on an inlet side of the curved portion, the first fin can control a direction of a flow at the curved portion or on the inlet side of the curved portion. As a result, the first fin can perform not only an operation suppressing a flow separation from the first surface portion of the inner surface of the duct but also an operation controlling a flow direction.

According to the duct structure according to an aspect of the disclosure, since the first fin is inclined such that the downstream end of the first fin is located closer to a second surface portion located at an inner side of curving of the curved portion than the upstream end of the first fin, the flow flowing through the first fin is directed toward the inner side of curving of the curved portion. As a result, the flow separation which may occur at the second surface of the inner surface of the duct at the curved portion or in the downstream of the curved portion can be suppressed by the first fin.

According to the duct structure according to an aspect of the disclosure, since the fin includes the second fin located at the curved portion or on the outlet side of the curved portion and the second fin is located at the second, side surface portion located at an inner side of curving of the curved portion, of the inner surface of the duct, a flow separation from the second surface portion of the inner surface of the duct at a downstream of the second fin can be suppressed.

According to the duct structure according to an aspect of the disclosure, since the height of the fin is equal to or smaller than one-fifth of a distance between opposing surface portions of the inner surface of the duct in the height direction of the fin, a pressure drop caused by the fin is more decreased than in a case where the fin is provided so as to extend over an entire distance between opposing surface portions of the inner surface of the duct.

According to the duct structure according to an aspect of the disclosure, since the fin is formed integral with the duct, the number of parts of the duct can be more decreased than in a case where the fin is formed separately from the duct.

Further, the fin can be formed simultaneously with forming of the duct. Therefore, it is not necessary to increase a manufacturing step in spite of providing the fin.

According to the duct structure according to an aspect of the disclosure, even in the case where the duct is the intake duct for supplying air to the vehicle engine and the fluid flowing in the fluid passage is air, an engine output can be improved.

According to the duct structure according to an aspect of the disclosure, since the side surfaces of the fin have side surface portions parallel to each other and extending in the height direction of the fin and the longitudinal direction of the fin, the fin can be made to be a thin plate. As a result, reduction of a cross-sectional area of the fluid passage caused by the fin can be made minimum. As a result, the pressure drop caused at the fin can be made small.

According to the duct structure according to an aspect of the disclosure, since the top surface of the fin extends from the upstream end of the top surface of the fin to the downstream end of the top surface of the fin in the longitudinal direction of the fin and the downstream end of the top surface is spaced away from the inner surface of the duct, the vortex can be intentionally generated in the downstream of the fin.

According to the duct structure according to an aspect of the disclosure, since the top surface of the fin includes the first inclined surface extending from the upstream end of the top surface of the fin to the highest portion of the fin in the longitudinal direction of the fin and in the height direction of the fin, an increase in flow resistance caused by the fin can be suppressed and a flow can be caused to flow along the first inclined surface. As a result, the pressure drop at the fin can be made small.

According to the duct structure according to an aspect of the disclosure, since the top surface of the fin includes the second inclined surface extending from the highest portion of the fin to the downstream end of the top surface in the longitudinal direction of the fin and in the height direction of the fin, a flow separation from the top surface of the fin can be suppressed. As a result, the pressure drop caused by the fin can be made small.

According to the duct structure according to an aspect of the disclosure, since the highest portion of the fin is located on the upstream side of the mid portion of the fin in the longitudinal direction of the fin, a length of the second inclined surface can be made larger than in a case where the highest portion of the fin is located on a downstream side of the mid portion of the fin in the longitudinal direction of the fin. As a result, an inclination angle of the second inclined surface can be relatively made small, whereby a flow separation from the second inclined surface can be suppressed.

According to the duct structure according to an aspect of the disclosure, the thickness of the fin is gradually decreased in the direction away from the root of the fin in the height direction of the fin, a reduction of a cross-sectional area of the fluid passage caused by the fin can be suppressed. Therefore, the pressure drop caused by the fin can be made small.

According to the duct structure according to an aspect of the disclosure, the fin includes the ridge, and the ridge includes the upstream end and the downstream end. The ridge of the fin extends from the upstream end of the ridge of the fin to the downstream end of the ridge of the fin in the longitudinal direction of the fin. The downstream end of the ridge is spaced away from the inner surface of the duct. As a result, the vortex can be intentionally generated in the downstream of the fin.

According to the duct structure according to an aspect of the disclosure, since the ridge of the fin includes the first inclined portion extending from the upstream end of the fin to the highest portion of the fin in the longitudinal direction of the fin and in the height direction of the fin, an increase in flow resistance caused by the fin can be suppressed and a flow can be caused to flow along the fin. As a result, the pressure drop caused by the fin can be decreased.

According to the duct structure according to an aspect of the disclosure, since the ridge of the fin includes the second inclined portion extending from the highest portion of the fin to the downstream end of the ridge in the longitudinal direction of the fin and in the height direction of the fin, the flow separation from the fin can be suppressed. As a result, the pressure drop caused by the fin can be decreased.

According to the duct structure according to an aspect of the disclosure, since the highest portion of the fin is located on the upstream side of the mid portion of the fin in the longitudinal direction of the fin, a length of the second inclined portion can be caused to be larger than in a case where the highest portion of the fin is located on a downstream side of the mid portion of the fin in the longitudinal direction of the fin. As a result, an inclination angle of the second inclined portion can be relatively made small, whereby a flow separation from the fin can be suppressed.

BRIEF DESCRIPTION OF THE DRAWINGS

FIG. 1 is applicable to Embodiment 2 of the present application by changing the fin configuration.

FIG. 2 is applicable to Embodiment 2 of the present application by changing the fin configuration.

FIG. 3 is applicable to Embodiment 2 of the present application.

FIG. 4 is applicable to Embodiment 2 of the present application by changing the fin configuration.

FIG. 7 is applicable to Embodiment 2 of the present application by changing the fin configuration.

FIG. 8 is applicable to Embodiment 2 of the present application by changing the fin configuration.

FIG. 13 is applicable to Embodiment 2 of the present application.

DETAILED DESCRIPTION

Figure 1:
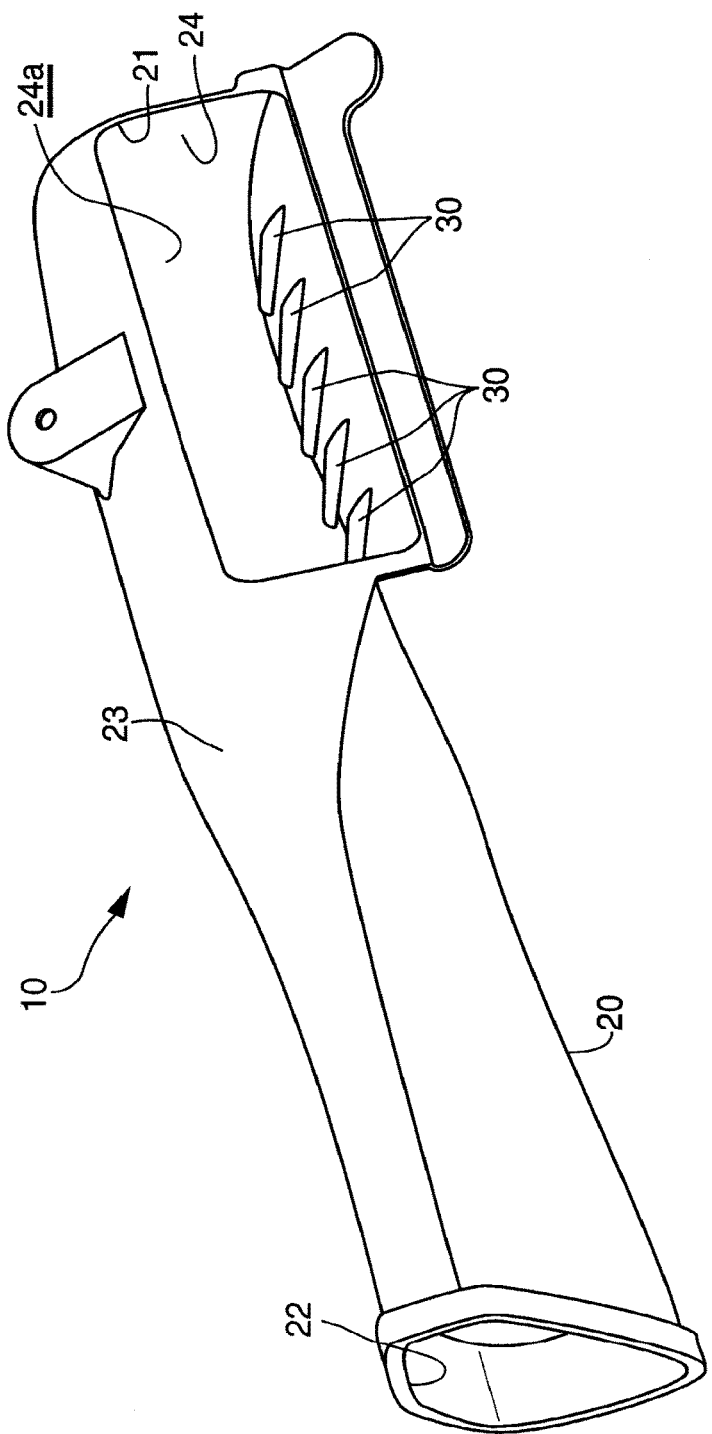
FIG. 1 is a perspective view of a duct structure according to Embodiment 1 of the present application.

FIGS. 1-13 illustrate a duct structure according to Embodiment 1 of the present application. FIGS. 14-19 illustrate a duct structure according to Embodiment 2 of the present application. Portions common over Embodiments 1 and 2 of the present application are denoted with the same reference numerals over Embodiments 1 and 2 of the present application.

First, portions common over Embodiments 1 and 2 of the present application will be explained.

As illustrated in FIG. 1, a duct structure (which may be called as "a duct apparatus") 10 according to the present application includes a duct 20 and a fin 30.

Figure 13:
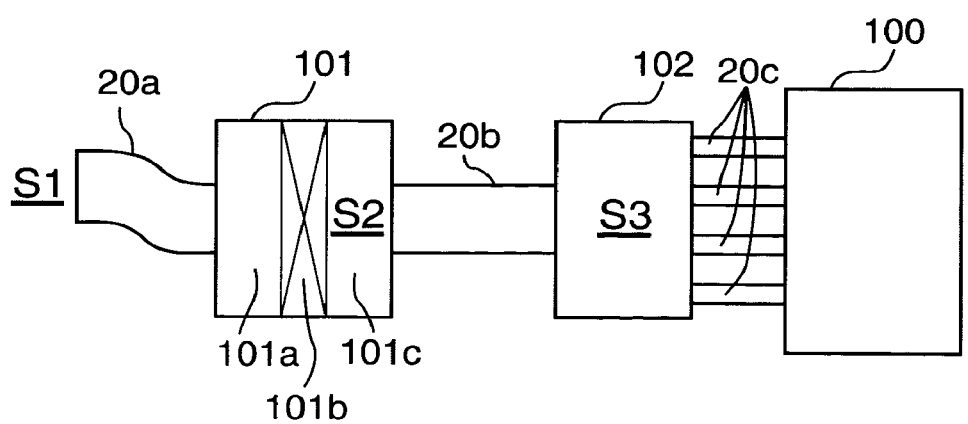
FIG. 13 is a system diagram of an intake system of an engine, where the duct structure according to Embodiment 1 of the present application is provided at the intake system.

As illustrated in FIG. 13, the duct 20 is an intake duct of a vehicle engine for supplying air to an engine 100. Alternatively, the duct 20 may be an exhaust duct (not shown) of the vehicle engine. In a case where the duct 20 is the intake duct, the duct 20 may be (i) an inlet duct 20a extending upstream in an intake gas flow direction from an air cleaner 101, (ii) a pipe portion or an air cleaner hose 20b extending downstream in the intake gas flow direction from the air cleaner 101 or (iii) an intake manifold 20c extending downstream in the intake gas flow direction from a surge tank 102.

A fluid (e.g. air) having flowed into the inlet duct 20a flows through the inlet duct 20a to an inlet side 101a of the air cleaner 101 and then flows through an air cleaner element 101b to an outlet side 101c of the air cleaner 101. Then, the fluid flows from the outlet side 101c of the air cleaner 101 through the air cleaner hose 20b to a surge tank 102. Then, the fluid flows from the surge tank 102 through the intake manifold 20c to the engine 100.

The duct 20 is made from, for example, resin. As illustrated in FIG. 1, the duct 20 includes an inlet 21, an outlet 22, and a connecting portion 23 (which may be called as "an intermediate portion") connecting the inlet 21 and the outlet 22. The duct 20 includes an inner surface 24 defining a fluid passage 24a therein.

Figure 7:
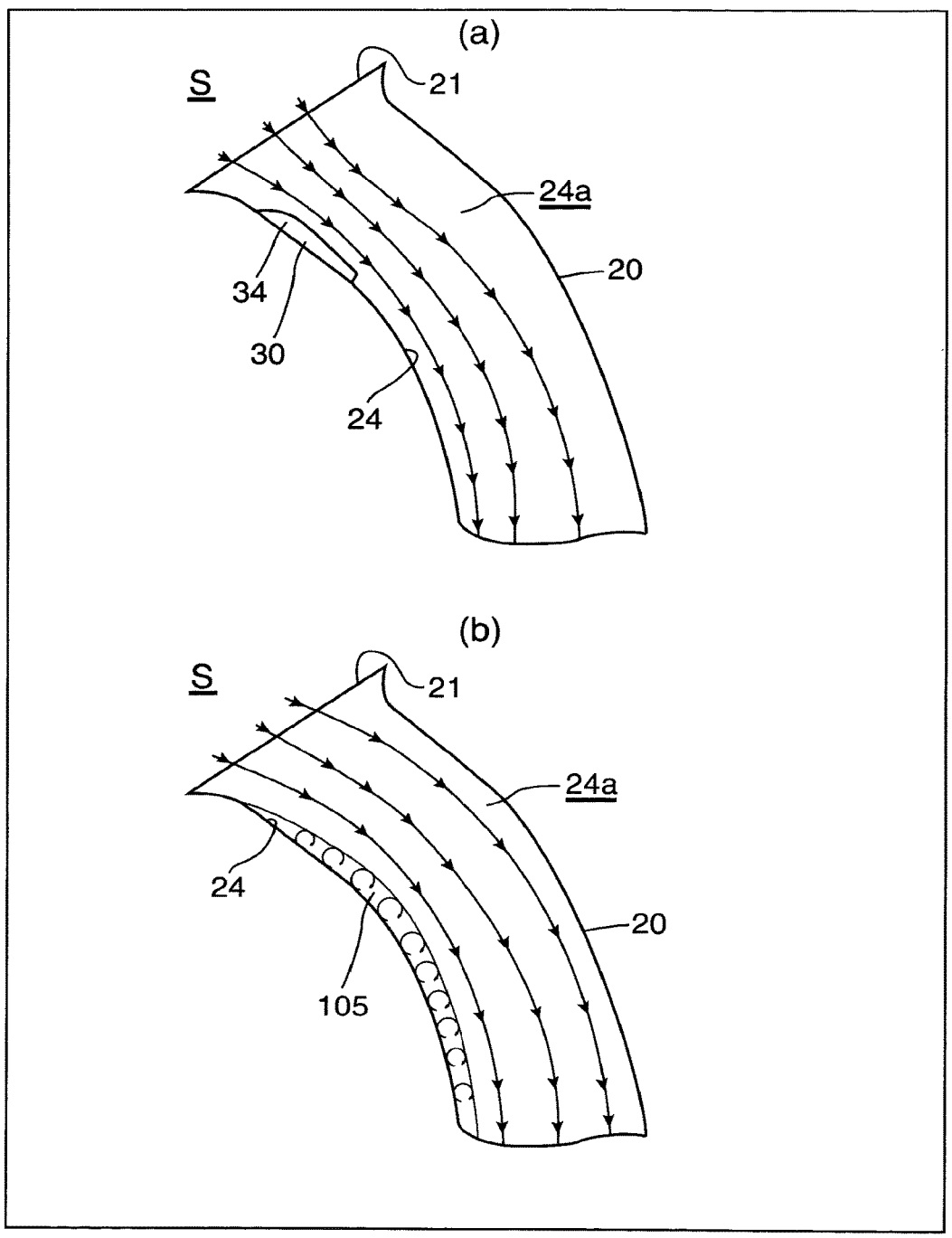
FIG. 7 is a schematic cross-sectional view of the duct structure of FIG. 2 taken along line A-A of FIG. 2 with a flow of a fluid shown by lines with plurality of arrows, where (a) of FIG. 7 corresponds to Embodiment 1 of the present application having the fin and (b) of FIG. 7 corresponds to a comparison having no fin.
Figure 8:
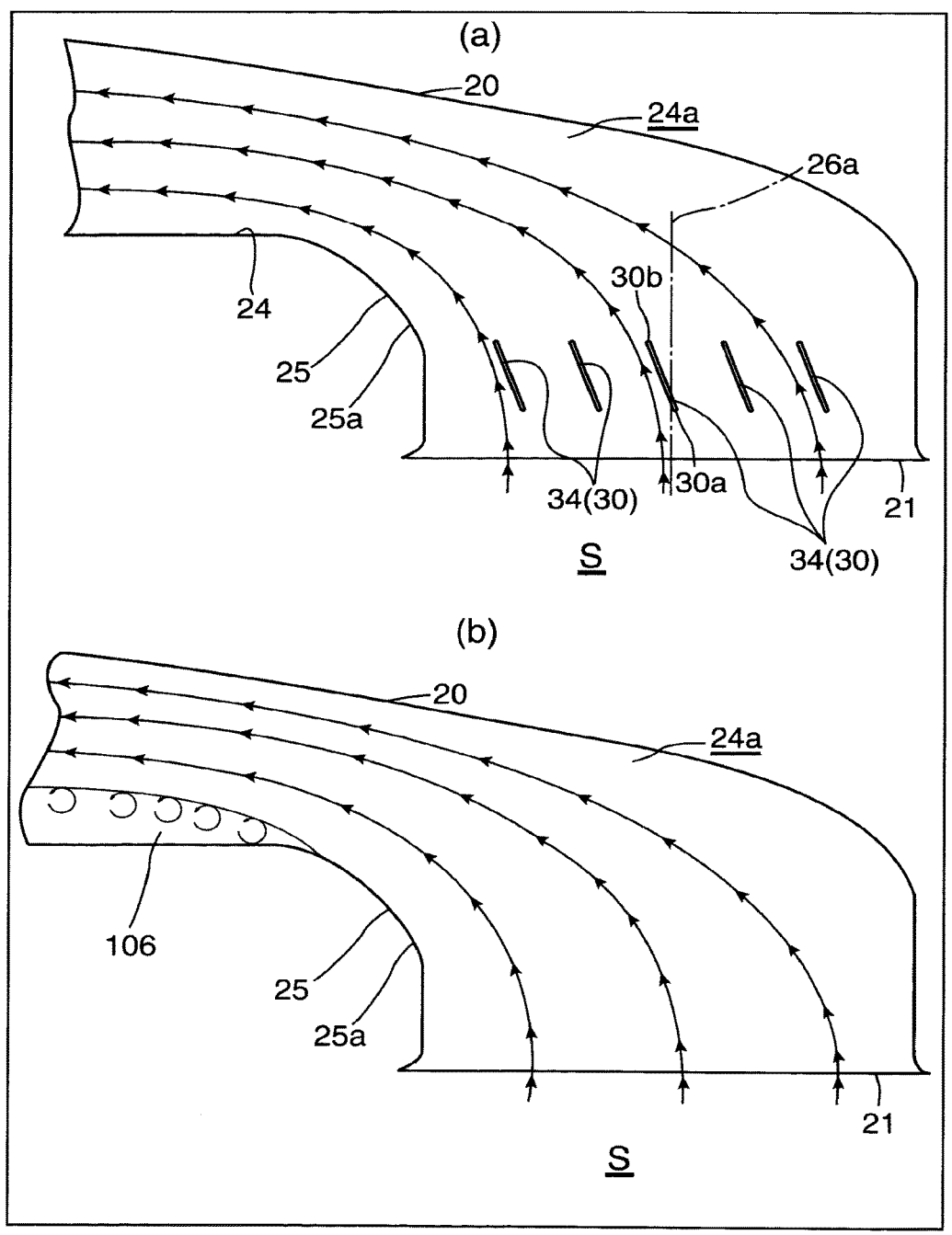
FIG. 8 is a schematic cross-sectional view of the duct structure of FIG. 3 taken along line C-C of FIG. 3 with a flow of a fluid shown by lines with plurality of arrows, where (a) of FIG. 8 corresponds to Embodiment 1 of the present application having the fin and (b) of FIG. 8 corresponds to a comparison having no fin.

The duct 20 includes one inlet 21 and one outlet 22. As illustrated in FIGS. 7 and 8, a space S having a cross-sectional area larger than a cross-sectional area of the inlet 21 is provided upstream of the inlet 21 so that the fluid flows from the space S to the fluid passage 24a through the inlet 21. As illustrated in FIG. 13, the space S may be any of the following spaces S1, S2 and S3. More particularly, (i) in a case where the duct 20 is the inlet duct 20a, the space S is the space S1 provided upstream of the inlet duct 20a in the intake gas flow direction. (ii) In a case where the duct 20 is the duct portion or the air cleaner hose 20b extending downstream in the intake gas flow direction from the air cleaner 101, the space S is the space S2 inside the air cleaner 101. (iii) In a case where the duct 20 is the intake manifold 20c, the space S is the space S3 inside the surge tank 102.

Figure 2:
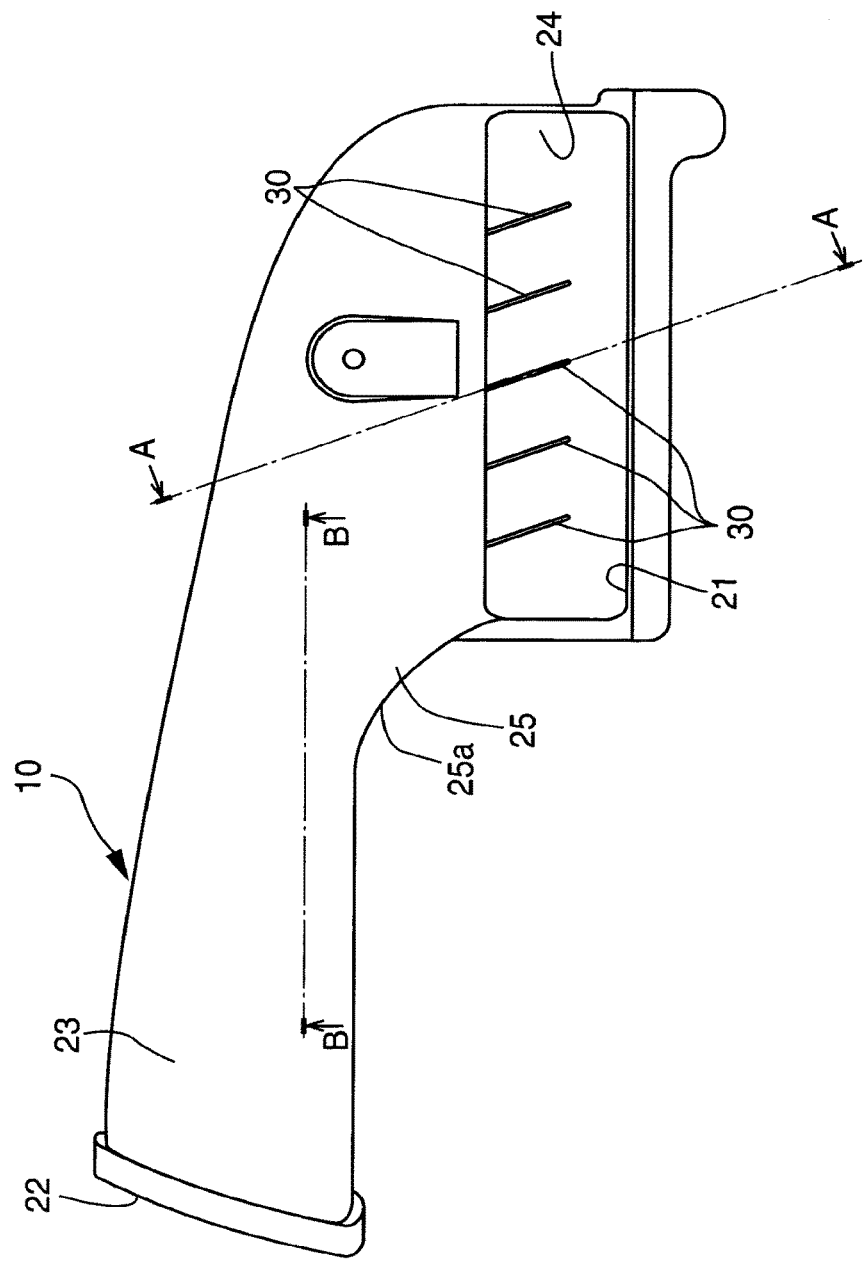
FIG. 2 is a front view of the duct structure according to Embodiment 1 of the present application.
Figure 3:
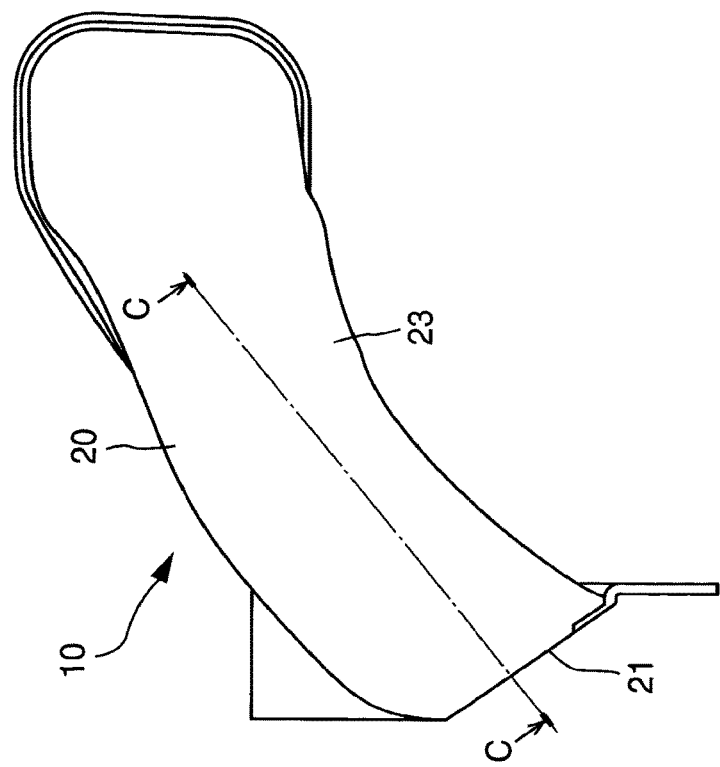
FIG. 3 is a side view of the duct structure according to Embodiment 1 of the present application.
Figure 4:
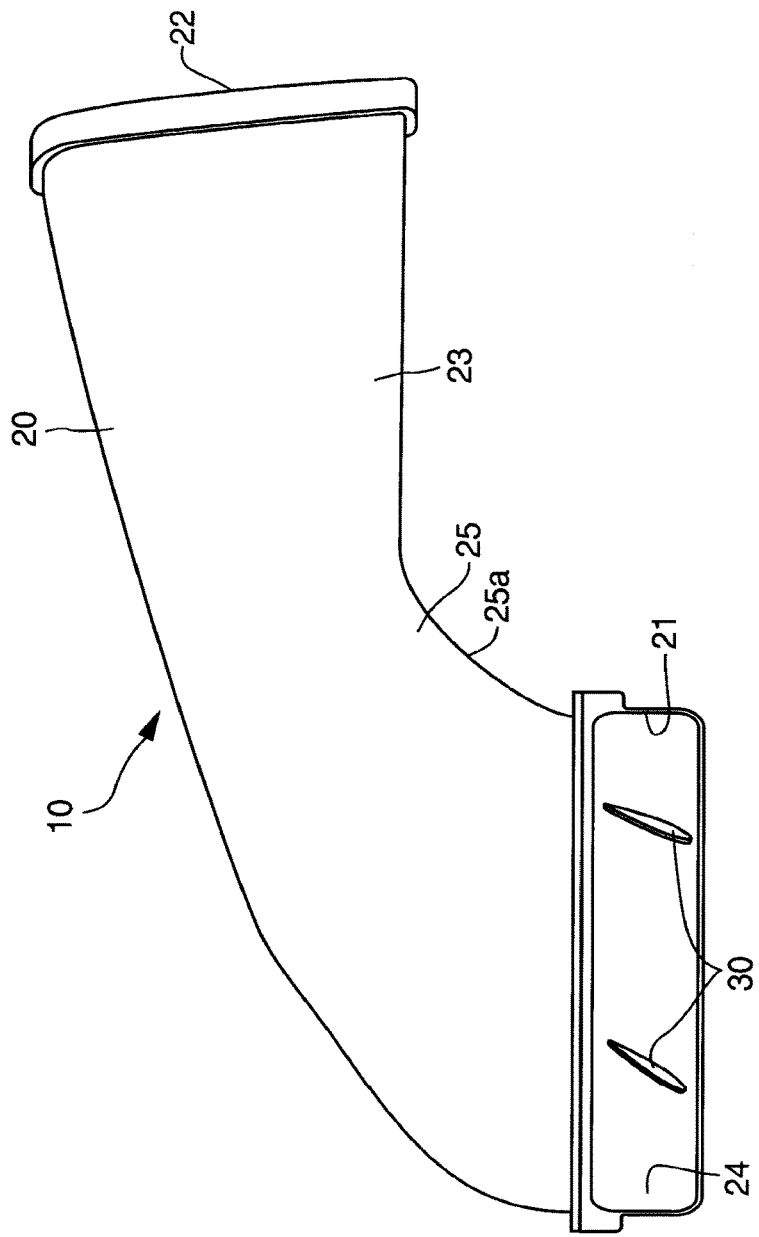
FIG. 4 is a bottom view of the duct structure according to Embodiment 1 of the present application.

As illustrated in FIG. 2, the connecting portion 23 is provided between the inlet 21 and the outlet 22. A curved portion 25 is formed at the connecting portion 23. One curved portion 25 is formed at the connecting portion 23. Alternatively, a plurality of curved portions 25 may be formed at the connecting portion 23. A direction of a flow flowing inside the fluid passage 24a is changed by the curved portion 25. The fluid passage 24a extends from the inlet 21 to the outlet 22.

Figure 5:
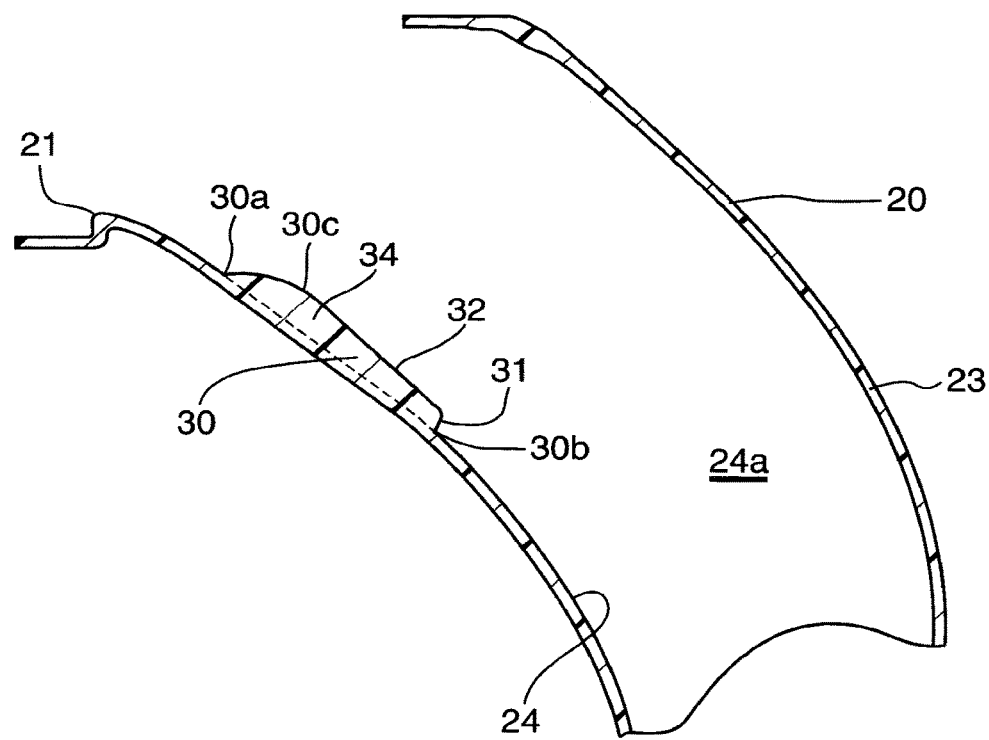
FIG. 5 is an enlarged cross-sectional view taken along line A-A of FIG. 2.
Figure 6:
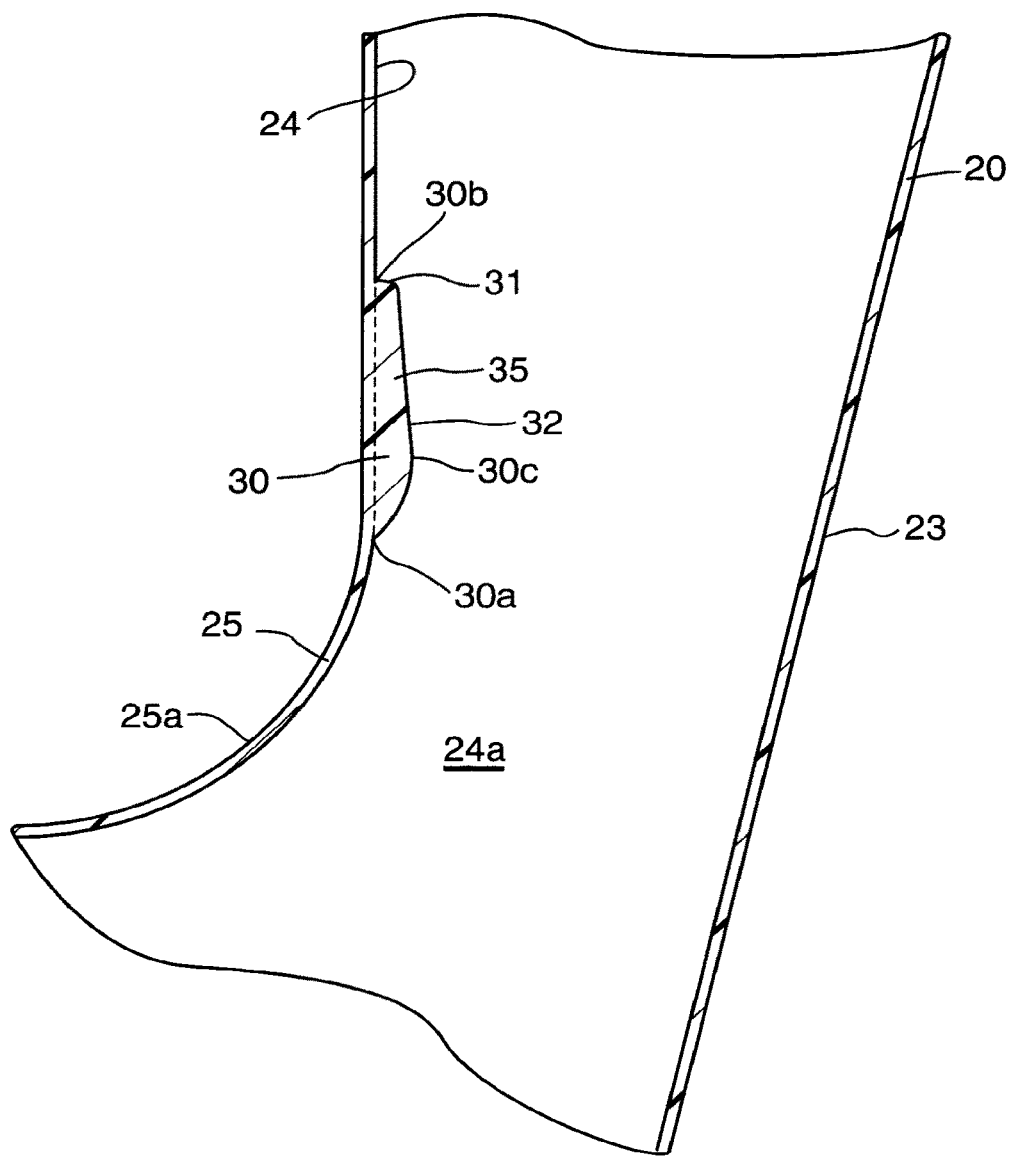
FIG. 6 is an enlarged cross-sectional view taken along line B-B of FIG. 2.

The fin 30 is formed so as to be integral with the duct 20. As illustrated in FIGS. 5 and 6, the fin 30 rises from the inner surface 24 of the duct 20 and ends inside the fluid passage 24a in a height direction of the fin 30. The fin 30 extends in a flow direction of the fluid flowing in the fluid passage 24a. The fin 30 includes an upstream end 30a and a downstream end 30b. The fin 30 extends from the upstream end 30a of the fin to the downstream end 30b of the fin in a longitudinal direction of the fin.

A height of the fin 30 in the height direction of the fin is selected to be equal to or smaller than one-third, or more preferably, one-fifth, of a distance between opposing surface portions of the inner surface 24 at a duct portion where the fin 30 is formed. The fin 30 includes a highest portion 30c highest in the height direction of the fin over an entire length of the fin. The highest portion 30c of the fin is located on an upstream side of a mid portion of the fin (i.e., closer to the upstream end 30a of the fin than the mid portion of the fin) in the longitudinal direction of the fin.

Figure 9:
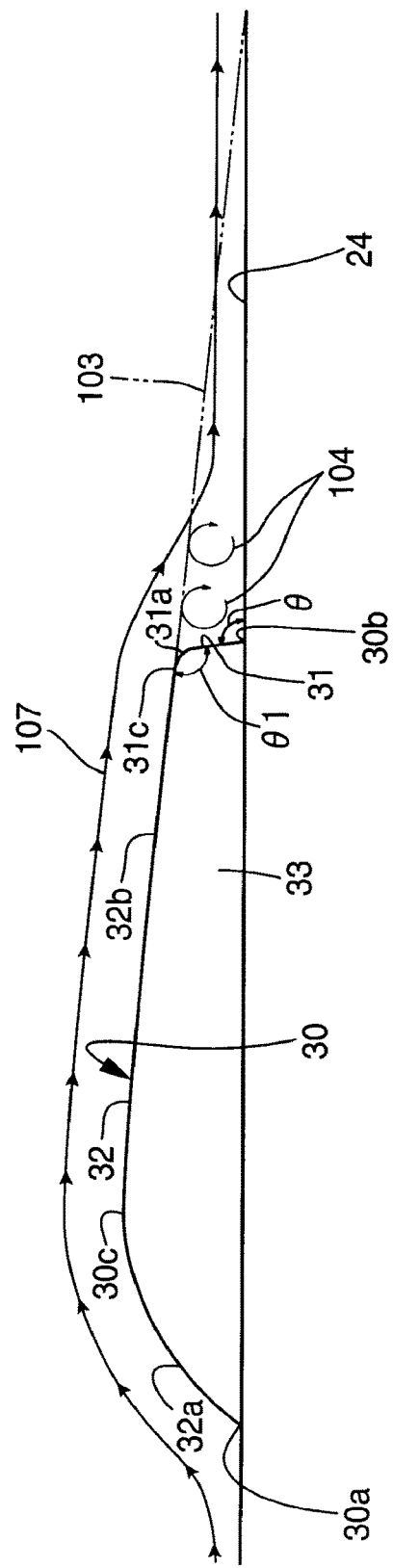
FIG. 9 is an enlarged side view of the fin of the duct structure according to Embodiment 1 of the present application.

As illustrated in FIG. 9, the fin 30 includes a downstream end surface 31 having a form obtained when cutting off a downstream end portion of the fin. The downstream end surface 31 may be connected to a top surface of the fin via a curved surface or an angled surface. The downstream end surface 31 may be connected to the inner surface 24 of the duct 20 via a curved surface or an angled surface. The curved surfaces and the angled surfaces define portions of the downstream end surface 31.

The downstream end surface 31 intentionally generates a vortex 104 downstream of the downstream end surface 31. An angle θ between the downstream end surface 31 and a portion of the inner surface 24 of the duct 20 located downstream of the downstream end surface 31 may be an angle smaller than or larger than, or equal to a right angle.

As illustrated in FIG. 7, since the space S having the cross-sectional area larger than the cross-sectional area of the inlet 21 is provided upstream of the inlet 21 of the duct 20, the flow of the fluid in the inlet 21 is considerably changed. As a result, as illustrated in (b) of FIG. 7, a flow separation 105 from a first surface portion (e.g., a bottom surface portion) located at the curved portion 25 of close to the inlet 21, of the inner surface 24 of the duct is likely to occur. Further, as illustrated in FIG. 8, since the curved portion 25 is formed at the connecting portion 23, the flow of the fluid at the curved portion 25 is considerably changed. As a result, as illustrated in (b) of FIG. 8, a flow separation 106 from a second surface portion (e.g., a side surface portion perpendicular to an extension of the first surface portion) located at the curved portion 25 or downstream of the curved portion, of the inner surface 24 of the duct is likely to occur. The first surface portion and the second surface portion may be smoothly connected with each other. Further, the first surface portion and the second surface portion may be connected with each other such that one of the first and second surface portions is twisted in an up-down direction or in a right-left direction of the duct. In order to suppress occurrence of the flow separations 105 and/or 106, the fin 30 may include any one or both of a first fin 34 and a second fin 35. The first fin 34 is provided at the first surface portion of the curved portion 25 or an inlet 21 side of the curved portion 25 located at an inner side 25a of curving of the curved portion 25, as shown in FIG. 5 and (a) of FIG. 7. The second fin 35 is provided at the second surface portion of the curved portion 25 or an outlet 22 side of the curved portion 25 located at an inner side 25a of curving of the curved portion 25, as shown in FIG. 6 and (a) of FIG. 8.

One or more of the first fin 34 may be provided. In a case where a cross-sectional shape of the inlet 21 of the duct 20 is a rectangle (or substantially a rectangle) including four planes, the first fin 34 may be provided at only one plane or two, three or four planes among the four planes. In a case where the first fins 34 are provided at two planes among the four planes, the two planes may be opposing two planes parallel to each other or continuing two planes perpendicular to each other.

As illustrated in (a) of FIG. 8, at least one of the first fins 34 is inclined relative to a center line 26a of the duct at a duct portion where the first fin 34 is located such that the downstream end 30b of the first fin 34 is located closer to the second surface portion located at the inner side 25a of curving of the curved portion 25, of the inner surface 24 of the duct than the upstream end 30a of the first fin 34. The first fin 34 is inclined in order that the direction of the flow is controlled and the flow separation 106 shown in (b) of FIG. 8 is suppressed.

In order to decrease a pressure drop generated at the first fin 34, an inclination angle of the first fin 34 relative to the center line 26a of the duct is desirably equal to or smaller than 15 degrees, and more desirably, equal to or smaller than 10 degrees.

The second fin 35 may be provided by only one or more than one.

A length and a height of the second fin 35 may be the same as those of the first fin 34 or may be different from that of the first fin 34.

Next, operations and effects caused by the structural portions common to Embodiments 1 and 2 of the present application will be explained.

(A) As illustrated in FIG. 9, since the fin 30 includes the downstream end surface 31 having the form obtained when cutting off a downstream end portion of the fin, a vortex 104 can be intentionally generated in the downstream of the downstream end surface 31 of the fin. Since a pressure in the vortex 104 is lower than a pressure in a surrounding portion of the vortex 104, the vortex 104 can draw a fluid portion having flowed along the top surface of the fin 30 and then flowing downstream of the downstream end surface 31 of the fin to the vortex 104 thereby causing the fluid portion to flow along a portion of the inner surface 24 of the duct located downstream of the downstream end surface 31 of the fin. As a result, a flow separation from the inner surface 24 of the duct at the downstream of the fin 30 can be suppressed. Further, a pressure loss of the flow of the fluid is decreased, whereby engine output can be improved.

Further, since the fin 30 is required only to rise from the inner surface 24 of the duct and to end in the fluid passage 24a in a height direction of the fin 30, the fin 30 is not required to extend over an entire cross-section of the duct 20. As a result, the height of the fin 30 can be made smaller than that of the conventional control plate 3. Thus, a pressure drop caused at the fin 30 is small and can be more decreased than a pressure drop caused at the conventional control plate 3. As a result, the pressure loss due to the fin 30 can be made small.

(B) As illustrated in FIG. 7, since the space S having the cross-sectional area larger than the cross-sectional area of the inlet 21 is provided upstream of the inlet 21 so that the fluid flows from the space S to the fluid passage 24a through the inlet 21, the flow of the fluid considerably changes at the inlet 21. When the first fin 34 is not provided, the flow separation 105 from the inner surface 24 of the duct close to the inlet 21 is likely to occur.

However, in the present application, since the fin 30 includes the first fin 34 provided inside the duct 20 and close to the inlet 21, occurrence of the flow separation 105 from the inner surface 24 of the duct in the downstream of the first fin 34 can be positively suppressed.

(C) As illustrated in FIG. 8, since the first fin 34 is provided on the inlet 21 side of the curved portion 25, a direction of a flow in the inlet side 21 of the curved portion 25 can be controlled by the first fin 34. As a result, the first fin 34 can have two effects of suppressing the flow separation from the first surface portion and controlling the flow direction.

(D) Since the first fin 34 is inclined such that the downstream end 30b of the fin is located closer to the second surface portion located at the inner side 25a of curving of the curved portion 25 than the upstream end 30a of the fin, the flow flowing through the first fin 34 is directed toward the inner side of curving of the curved portion 25. As a result, the flow separation 106 which may occur at the second surface of the inner surface 24 of the duct at the curved portion 25 or in the downstream of the curved portion 25 can be suppressed by the first fin 34.

(E) As illustrated in FIG. 6, since the fin 30 includes the second fin 35 located at the curved portion 25 or on the outlet 22 side of the curved portion 25 and the second fin 30 is located at the second, side surface portion located at an inner side 25a of curving of the curved portion 25, of the inner surface 24 of the duct 20, a flow separation from the second surface portion of the inner surface 24 of the duct 20 at a downstream of the second fin 35 can be suppressed.

(F) Since the height of the fin 30 is equal to or smaller than one-fifth of a distance between opposing surface portions of the inner surface 24 of the duct 20 in the height direction of the fin 30, a pressure drop caused by the fin 30 is more decreased than in a case where the fin 30 is provided so as to extend over an entire distance between opposing surface portions of the inner surface 24 of the duct 20.

(G) Since the fin 30 is formed integral with the duct 20, the number of parts of the duct 20 can be more decreased than in a case where the fin 30 is formed separately from the duct 20.

Further, the fin 30 can be formed simultaneously with forming of the duct 20. Therefore, it is not necessary to increase a manufacturing step in spite of providing the fin 30.

(H) Even in the case where the duct 20 is the intake duct for supplying air to the vehicle engine 100 and the fluid flowing in the fluid passage is air, the same technical advantages as those obtained in the duct structures of (A)-(G) above can be obtained. Therefore, an engine output can be improved.

Next, structures and operations of portions unique to each embodiment of the present application will be explained.

Embodiment 1

Structures of portions unique to Embodiment 1 will be explained.

Figure 10:
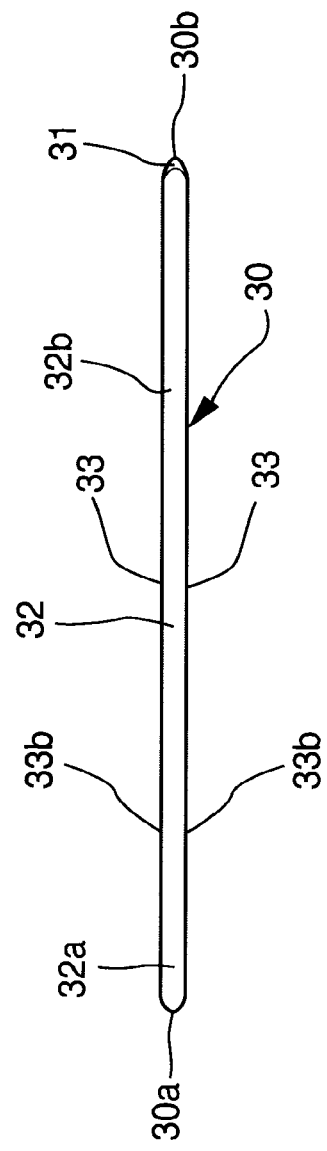
FIG. 10 is an enlarged plan view of the fin of the duct structure according to Embodiment 1 of the present application.

In Embodiment 1, the fin 30 includes a top surface 32 shown in FIG. 9 and a pair of side surfaces 33 having side surface portions 33b parallel with each other shown in FIG. 10.

As illustrated in FIG. 9, the top surface 32 of the fin includes an upstream end and a downstream end. The upstream end and the downstream end of the top surface 32 may coincide with the upstream end 30a and the downstream end 30b, respectively, of the fin in position in the longitudinal direction of the fin. The top surface 32 of the fin extends from the upstream end 30a of the top surface 32 to the downstream end 32c of the top surface 32 of the fin in the longitudinal direction of the fin. The downstream end 32c of the top surface 32 of the fin is spaced away from the inner surface 24 of the duct 20.

Figure 11:
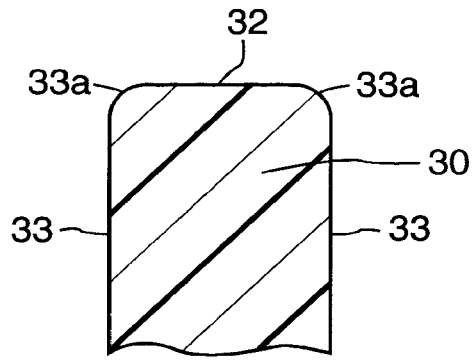
FIG. 11 is an enlarged, partial cross-sectional view of the fin of the duct structure according to Embodiment 1 of the present application, where a top surface of the fin is a flat surface.
Figure 12:
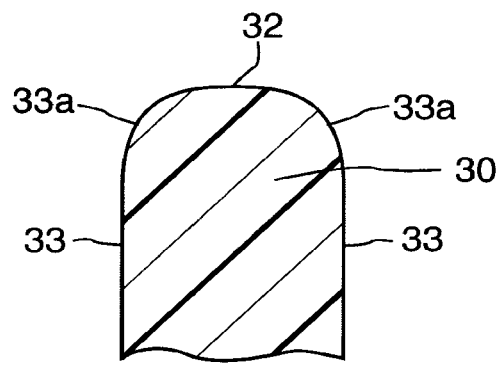
FIG. 12 is an enlarged, partial cross-sectional view of the fin of the duct structure according to Embodiment 1 of the present application, where a top surface of the fin is a curved surface.

A cross-sectional configuration of the top surface 32 of the fin taken along a flat plane perpendicular to the longitudinal direction of the fin 30 may include a straight line as illustrated in FIG. 11, or an arc or an ellipse having a radius of curvature larger than that of a higher end (i.e., a top surface 32 side end) 33a of the side surface 33 of the fin located at the opposite ends of the top surface 32 as illustrated in FIG. 12.

As illustrated in FIG. 9, the top surface 32 includes a first inclined surface 32a and a second inclined surface 32b. The highest portion 30c of the fin is located upstream of a mid portion of the fin in the longitudinal direction of the fin 30.

The first inclined surface 32a extends from the upstream end of the top surface 32 to the highest portion 30c of the fin in the longitudinal direction of the fin and in the height direction of the fin. An inclination angle of the first inclined surface 32a relative to the inner surface 24 of the duct 20 is selected such that an increase in a flow resistance caused by the fin can be suppressed and the fluid can flow along the first inclined surface 32.

The second inclined surface 32b extends from the highest portion 30c of the fin to the downstream end of the top surface 32 in the longitudinal direction of the fin and in the height direction of the fin. Therefore, the vortex 104 generated in the downstream of the fin can draw a flow 107 of the fluid having flowed along the second inclined surface 32b to the vortex 104 and can change the flow to a flow flowing along the portion of the inner surface 24 of the duct 20 located in the downstream of the fin 30. An inclination angle of the second inclined surface 32b relative to the inner surface 24 of the duct 20 is selected such that a flow separation from the second inclined surface 32b can be suppressed.

The highest portion 30c of the fin is located between the first inclined surface 32a and the second inclined surface 32b. It is preferable that the first inclined surface 32a and the second inclined surface 32b are smoothly connected to each other via the highest portion 30c of the fin in a side view of the fin 30.

The downstream end surface 31 of the fin extends between the inner surface 24 of the duct 20 and the downstream end 32c of the top surface 32 of the fin in the height direction of the fin. A higher end portion (i.e., a top surface 32 side end portion) 31a of the downstream end surface 31 of the fin may be curved toward the downstream end 32c of the top surface 32 of the fin, whereby the downstream end surface 31 and the downstream end 32c of the top surface 32 of the fin are smoothly connected to each other. An angle θ1 between the second inclined surface 32b of the crest surface 32 of the fin and the downstream end surface 31 of the fin may be an angle larger than a right angle, just a right angle, or smaller than a right angle. The downstream end surface 31 of the fin is located upstream of a downstream extension 103 of the top surface 32 tangentially extending from the downstream end 32c of the top surface 32. Therefore, a downstream end of the fin has a form formed by cutting a downstream end portion of the fin 30 in the side view of the fin 30, whereby the vortex 104 can be intentionally generated in the downstream of the downstream end surface 31 of the fin in the longitudinal direction of the fin.

As illustrated in FIG. 10, the fin 30 includes a pair of side surfaces 33 located on opposite sides of the fin in a width direction (i.e., a thickness direction) of the fin. Each of the side surfaces 33 of the fin extends between the inner surface 24 of the duct 20 and the top surface 32 of the fin in the height direction of the fin. As illustrated in FIGS. 11 and 12, the higher end (i.e., the top surface 32 side end) 33a of each of the side surfaces 33 of the fin is curved toward the top surface 32 of the fin, whereby the side surfaces 33 of the fin and the top surface 32 of the fin are smoothly connected to each other.

As illustrated in FIG. 10, the side surfaces 33 have the side surface portions 33b parallel to each other and extending in the height direction of the fin and the longitudinal direction of the fin. Since the side surfaces 33 of the fin have side surface portions 33b parallel to each other, the fin 30 can be like a plate having a constant thickness (including a substantially constant thickness). In order to decrease a pressure drop caused at the fin 30, the fin 30 is selected to be a thin plate. A maximum thickness of the fin 30 is selected to be equal to or larger than 1 mm and equal to or smaller than 1.5 mm. The reason why the thickness of the fin 30 should be equal to or larger than 1 mm is for making forming the fin 30 possible. The reason why the thickness of the fin 30 should be equal to or smaller than 1.5 mm is for making a pressure drop caused at the fin 30 small. The fin 30 may have the constant thickness over an entire area of the fin in the longitudinal direction of the fin or an entire area of the fin except the upstream end of the fin and the downstream end of the fin in the longitudinal direction of the fin.

Operations and effects of portions unique to embodiment 1 will be explained.

(I-1) As illustrated in FIG. 9, since the top surface 32 of the fin extends from the upstream end of the top surface 32 of the fin to the downstream end of the top surface 32 of the fin in the longitudinal direction of the fin and the downstream end of the top surface 32 of the fin is spaced away from the inner surface 24 of the duct 20, the vortex 104 can be intentionally generated in the downstream of the fin 30.

(I-2) As illustrated in FIG. 10, the fin 30 includes the side surfaces 33 of the fin located on opposite sides of the fin in the thickness direction of the fin and extending between the inner surface 24 of the duct 20 and the top surface 32 of the fin in the height direction of the fin. Further, the side surfaces 33 have the side surface portions 33b parallel to each other and extending in the height direction of the fin and the longitudinal direction of the fin. As a result, the fin 30 can be configured to be a thin plate. Therefore, a reduction of a cross-sectional area of the fluid passage 24a due to the fin 30 can be made small, and a pressure drop caused by the fin 30 can be made small.

(I-3) As illustrated in FIG. 9, since the top surface 32 of the fin includes the first inclined surface 32a extending from the upstream end of the top surface 32 of the fin to the highest portion 30c of the fin in the longitudinal direction of the fin and in the height direction of the fin, an increase in a flow resistance caused by the fin can be suppressed and the flow can be controlled to a flow flowing along the first inclined surface 32a. Therefore, the pressure drop caused by the fin 30 can be made small.

(I-4) Since the top surface 32 of the fin includes the second inclined surface 32b extending from the highest portion 30c of the fin to the downstream end 32c of the top surface 32 in the longitudinal direction of the fin and in the height direction of the fin, the flow separation from the top surface 32 of the fin can be suppressed. Therefore, the pressure drop caused by the fin 30 can be made small.

(I-5) Since the top surface 32 of the fin includes the second inclined surface 32b, the flow 107 of the fluid having flowed along the second inclined surface 32b is drawn to the vortex 104 generated in the downstream of the fin 30 and can be changed to a flow flowing along the portion of the inner surface 24 of the duct 20 located downstream of the fin 30.

(I-6) Since the highest portion 30c of the fin is located upstream of the mid portion of the fin 30 in the longitudinal direction of the fin, a length of the second inclined surface 32b can be made larger than in a case where the highest portion 30c of the fin is located on a downstream side of the mid portion of the fin 30 in the longitudinal direction of the fin. As a result, an inclination angle of the second inclined surface 32b can be made small, whereby the flow separation from the second inclined surface 32b can be suppressed.

Embodiment 2

Next, structures of portions unique to Embodiment 2 will be explained.

Figure 16:
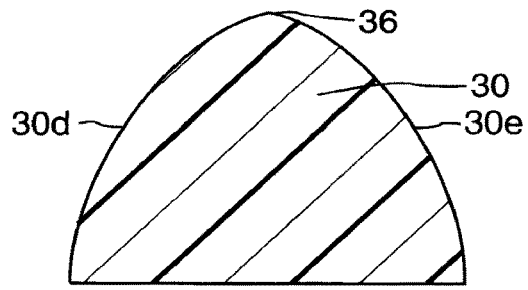
FIG. 16 is a partial, enlarged cross-sectional view of a fin of a duct structure according to a first case of Embodiment 2 of the present application taken along line D-D of FIG. 14, where a cross-sectional configuration of the fin includes two curved side surfaces crossing each other at a top of the fin.
Figure 17:
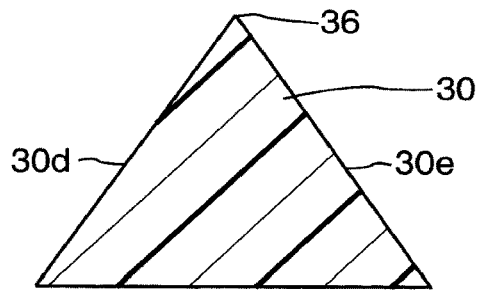
FIG. 17 is an enlarged cross-sectional view of a fin of a duct structure according to a second case of Embodiment 2 of the present application, where a cross-sectional configuration of the fin is triangular.

In Embodiment 2, as illustrated in FIGS. 16 and 17 the thickness of the fin 30 is gradually decreased in a direction away from a root of the fin in the height direction of the fin.

Figure 18:
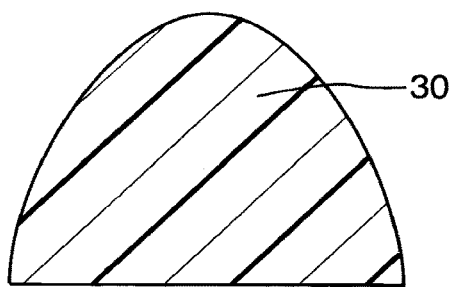
FIG. 18 is an enlarged cross-sectional view of a fin of a duct structure according to a third case of Embodiment 2 of the present application, where a cross-sectional configuration of a top portion of the fin includes a curved surface.
Figure 19:
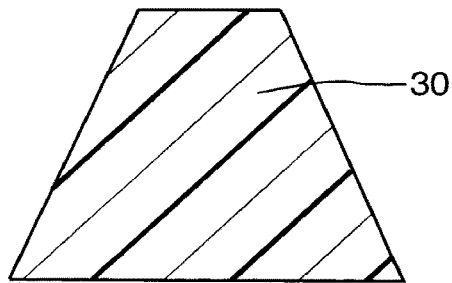
FIG. 19 is an enlarged cross-sectional view of a fin of a duct structure according to a fourth case of Embodiment 2 of the present application, where a top portion of the fin in a flat surface.
Figure 20:
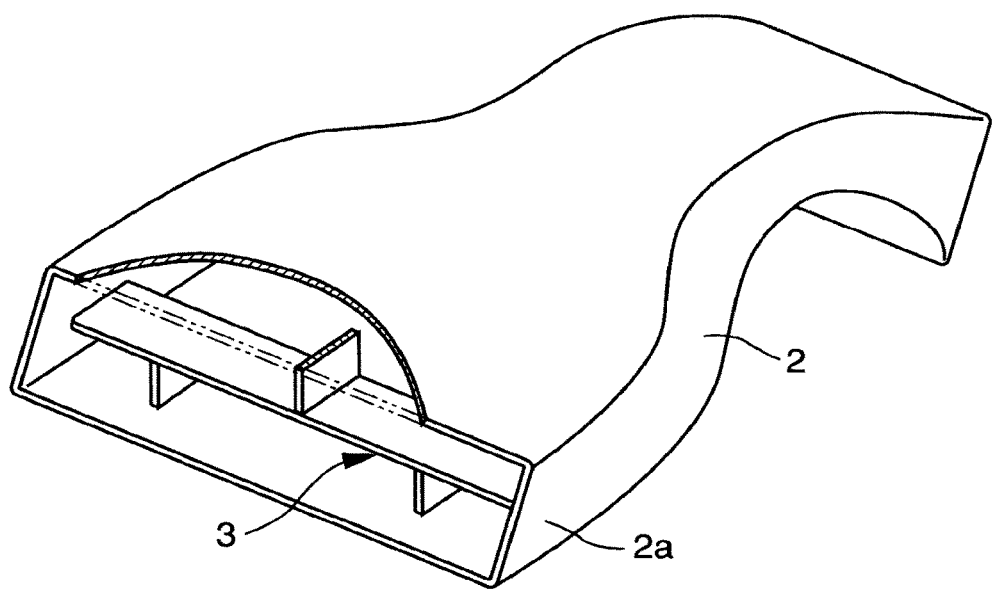
FIG. 20 is a perspective view of a conventional duct structure.

As illustrated in FIGS. 16 and 17, the fin 30 may include an angled ridge (hereinafter, a ridge) 36 at a higher end of the fin in the height direction of the fin. Contrarily, as illustrated in FIGS. 18 and 19, the ridge at the higher end of the fin may be replaced by a curved surface or a flat plane. In the explanation about Embodiment 2 below, the fin 30 having the ridge 36 will be taken as an example of the fin.

Figure 14:
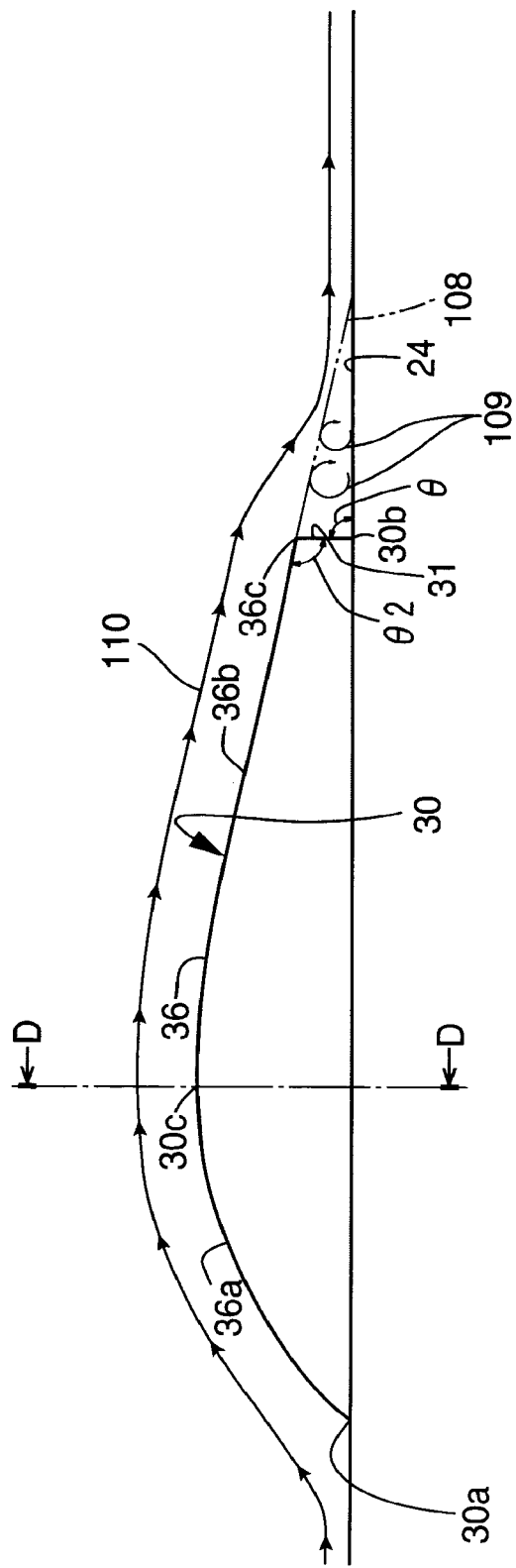
FIG. 14 is an enlarged side view of a fin of a duct structure according to Embodiment 2 of the present application.

As illustrated in FIG. 14, the ridge 36 of the fin includes an upstream end and a downstream end 36c. The upstream end and the downstream end of the ridge 36 of the fin may coincide with the upstream end 30a and the downstream end 30b, respectively, of the fin in position in the longitudinal direction of the fin.

The ridge 36 of the fin extends from the upstream end of the ridge 36 to the downstream end 36c of the ridge 36 of the fin in the longitudinal direction of the fin. The downstream end 36c of the ridge 36 is spaced away from the inner surface 24 of the duct 20 in the height direction of the fin.

The ridge 36 of the fin includes a first inclined portion 36a and a second inclined portion 36b.

The first inclined portion 36a extends from the upstream end of the ridge 36 to the highest portion 30c of the fin in the longitudinal direction of the fin and in the height direction of the fin. An inclination angle of the first inclined portion 36a of the ridge 36 relative to the inner surface 24 of the duct 20 is selected to be an angle such that the increase in a flow resistance caused by the fin 30 can be suppressed and the fluid can flow along the fin 30.

The second inclined portion 36b extends from the highest portion 30c of the fin to the downstream end 36c of the ridge 36 in the longitudinal direction of the fin and in the height direction of the fin. The flow 110 of the fluid having flowed along the second inclined portion 36b is drawn to a vortex 109 generated in the downstream of the fin 30 and is changed to a flow flowing along the portion of the inner surface 24 of the duct 20 located downstream of the fin 30. An inclination angle of the second inclined portion 36b of the ridge 36 relative to the inner surface 24 of the duct 20 is selected to be an angle such that a flow separation from the fin 30 can be suppressed. The highest portion 30c of the fin is located between the first inclined portion 36a and the second inclined portion 36b. It is desirable that the first inclined portion 36a and the second inclined portion 36b are smoothly connected to each other via the highest portion 30c of the fin in the side view of the fin.

The downstream end surface 31 of the fin is located upstream of an extension 108 of the ridge 36 tangentially extending from the downstream end 36c of the ridge 36. Therefore, a downstream end of the fin has a form formed by cutting a downstream end portion of the fin 30 in the side view of the fin 30, whereby the vortex 104 can be intentionally generated in the downstream of the downstream end surface 31 of the fin in the longitudinal direction of the fin. An angle θ2 between the second inclined portion 36b of the ridge 36 of the fin and the downstream end surface 31 of the fin may be an angle larger than a right angle, just a right angle or an angle smaller than a right angle. A cross-sectional shape of the fin 30 taken along a flat plane perpendicular to the longitudinal direction of the fin may be a triangle where each of two sides 30d, 30e of the triangle located on opposite sides of the ridge 36 is a curved line as illustrated in FIG. 16 or a straight line as illustrated in FIG. 17.

Figure 15:
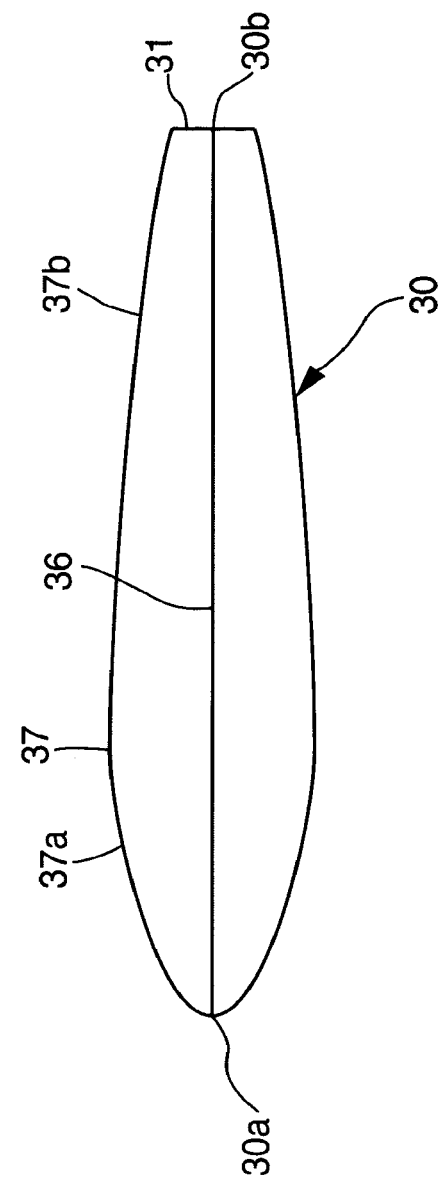
FIG. 15 is an enlarged plan view of the fin of the duct structure according to Embodiment 2 of the present application.

As illustrated in FIG. 15, the fin 30 includes a thickest portion 37 thickest in the fin 30 in a plan view of the fin. The thickest portion 37 is located at an intermediate portion of the fin in the longitudinal direction of the fin. The thickest portion 37 is located upstream of the mid portion of the fin 30 in the longitudinal direction of the fin. The fin 30 includes a third inclined portion (where the side surfaces of the fin are inclined relative to a center line of the fin) 37a where the thickness of the fin 30 is gradually increased in a direction away from the upstream end 30a toward the thickest portion 37. The fin 30 includes a fourth inclined portion (where the side surfaces of the fin are inclined relative to the center line of the fin) 37b where the thickness of the fin 30 is gradually decreased in a direction away from the thickest portion 37b toward the downstream end 30b of the fin.

Operations and effects of portions unique to Embodiment 2 will be explained.

(J-1) Since the thickness of the fin 30 is gradually decreased in the direction away from the root of the fin in the height direction of the fin, a reduction of a cross-sectional area of the fluid passage 24a caused by the fin 30 can be suppressed. Therefore, a pressure drop caused by the fin 30 can be made small.

(J-2) The fin 30 includes the ridge 36. Since the ridge 36 of the fin extends from the upstream end of the ridge 36 to the downstream end 36c of the ridge 36 in the longitudinal direction of the fin and the downstream end 36c of the ridge 36 is spaced away from the inner surface 24 of the duct, the vortex 109 can be intentionally generated in the downstream of the fin 30.

(J-3) Since the ridge 36 of the fin includes the first inclined portion 36a extending from the upstream end of the ridge 36 to the highest portion 30c of the fin in the longitudinal direction of the fin and in the height direction of the fin, an increase in a flow resistance caused by the fin 30 can be suppressed and the fluid flow can be changed to a flow flowing along the fin 30. As a result, the pressure drop caused by the fin 30 can be made small.

(J-4) Since the ridge 36 of the fin includes the second inclined portion 36b extending from the highest portion 30c of the fin to the downstream end 36c of the ridge 36 in the longitudinal direction of the fin and in the height direction of the fin, the flow separation from the fin 30 can be suppressed. As a result, the pressure drop caused by the fin 30 can be made small.

(J-5) Since the ridge 36 of the fin includes the second inclined portion 36b, the flow 110 of the fluid having flowed along the second inclined portion 36b is drawn to the vortex 109 generated in the downstream of the fin 30 and can be changed to a flow flowing along the portion of the inner surface 24 of the duct 20 located in the downstream of the fin 30.

(J-6) Since the highest portion 30c of the fin is located upstream of the mid portion of the fin 30 in the longitudinal direction of the fin, a length of the second inclined portion 36b can be made larger than in a case where the highest portion 30c of the fin is located downstream of the mid portion of the fin 30 in the longitudinal direction of the fin. As a result, an inclination angle of the second inclined portion 36b relative to the inner surface 24 of the duct 20 can be made small, whereby the flow separation from the fin 30 can be suppressed.

(J-7) Since the thickness of the fin 30 is gradually decreased in the direction away from the root of the fin in the height direction of the fin, not only the flow of the fluid above the fin 30 but also the flow of the fluid of the side of the fin 30 can be changed to a flow flowing along the fin 30.

The invention claimed is:

1. A duct structure comprising:
   a duct; and
   a fin, wherein
   the duct includes an inlet, an outlet and a connecting portion connecting the inlet and the outlet, the duct including an inner surface defining a fluid passage therein,
   the fin rises from the inner surface of the duct and ends in the fluid passage in a height direction of the fin, the fin including an upstream end and a downstream end and extending from the upstream end of the fin to the downstream end of the fin in a longitudinal direction of the fin,
   the fin includes a downstream end surface having a form obtained when cutting off a downstream end portion of the fin and generating a vortex in a downstream of the downstream end surface of the fin when a fluid flows in the fluid passage,
   a space having a cross-sectional area larger than a cross-sectional area of the inlet is provided upstream of the inlet so that a fluid flows from the space to the fluid passage through the inlet, and
   the fin includes a first fin including an upstream end and a downstream end and located at an inlet side end portion of the inner surface of the duct.

2. The duct structure according to claim 1, wherein the duct includes a curved portion formed at the connecting portion, the first fin being located at the curved portion or upstream of the curved portion and at a first surface portion of the inner surface of the duct.

3. The duct structure according to claim 2, wherein the first fin is inclined such that the downstream end of the first fin is located closer to a second surface portion located at an inner side of curving of the curved portion, of the inner surface of the duct than the upstream end of the first fin.

4. The duct structure according to claim 1, wherein
   the duct includes a curved portion formed at the connecting portion, and
   the fin includes a second fin located at the curved portion or downstream of the curved portion, the second fin being located at a second surface portion located at an inner side of curving of the curved portion, of the inner surface of the duct.

5. The duct structure according to claim 1, wherein a height of the fin is equal to or smaller than one-fifth of a distance between opposing surface portions of the inner surface of the duct in the height direction of the fin.

6. The duct structure according to claim 1, wherein the fin is formed integral with the duct.

7. The duct structure according to claim 1, wherein
   the duct is an intake duct for supplying air to a vehicle engine, and a fluid flowing in the fluid passage is air.

8. A duct structure comprising:
   a duct; and
   a fin, wherein
   the duct includes an inlet, an outlet and a connecting portion connecting the inlet and the outlet, the duct including an inner surface defining a fluid passage therein,
   the fin rises from the inner surface of the duct and ends in the fluid passage in a height direction of the fin, the fin including an upstream end and a downstream end and extending from the upstream end of the fin to the downstream end of the fin in a longitudinal direction of the fin,
   the fin includes a downstream end surface having a form obtained when cutting off a downstream end portion of the fin and generating a vortex in a downstream of the downstream end surface of the fin when a fluid flows in the fluid passage,
   the fin includes a pair of side surfaces on opposite sides thereof in a width direction of the fin,
   the side surfaces of the fin have surface portions parallel to each other and extending in the height direction of the fin and the longitudinal direction of the fin,
   the fin includes a top surface,
   the top surface of the fin includes an upstream end and a downstream end, and
   the top surface of the fin extends from the upstream end of the top surface of the fin to the downstream end of the top surface of the fin in the longitudinal direction of the fin and the downstream end of the top surface of the fin is spaced away from the inner surface of the duct.

9. The duct structure according to claim 8, wherein
the fin includes a highest portion highest in the height direction of the fin, and
the top surface of the fin includes a first inclined surface extending from the upstream end of the top surface of the fin to the highest portion of the fin in the longitudinal direction of the fin and in the height direction of the fin.

10. The duct structure according to claim 9, wherein the top surface of the fin includes a second inclined surface extending from the highest portion of the fin to the downstream end of the top surface of the fin in the longitudinal direction of the fin and in the height direction of the fin.

11. The duct structure according to claim 10, wherein the highest portion of the fin is located on an upstream side of a mid portion of the fin in the longitudinal direction of the fin.

12. The duct structure according to claim 1, wherein a thickness of the fin is gradually decreased in a direction away from a root of the fin in the height direction of the fin.

13. The duct structure according to claim 12, wherein the fin includes a ridge, and
the ridge of the fin includes an upstream end and a downstream end,
the ridge of the fin extends from the upstream end of the ridge of the fin to the downstream end of the ridge of the fin in the longitudinal direction of the fin and the downstream end of the ridge of the fin is spaced away from the inner surface of the duct.

14. The duct structure according to claim 13, wherein
the fin includes a highest portion highest in the height direction of the fin, and
the ridge of the fin includes a first inclined portion extending from the upstream end of the ridge of the fin to the highest portion of the fin in the longitudinal direction of the fin and in the height direction of the fin.

15. The duct structure according to claim 14, wherein the ridge of the fin includes a second inclined portion extending from the highest portion of the fin to the downstream end of the ridge of the fin in the longitudinal direction of the fin and in the height direction of the fin.

16. The duct structure according to claim 15, wherein the highest portion of the fin is located on an upstream side of a mid portion of the fin in the longitudinal direction of the fin.

* * * * *